Patented Nov. 24, 1931

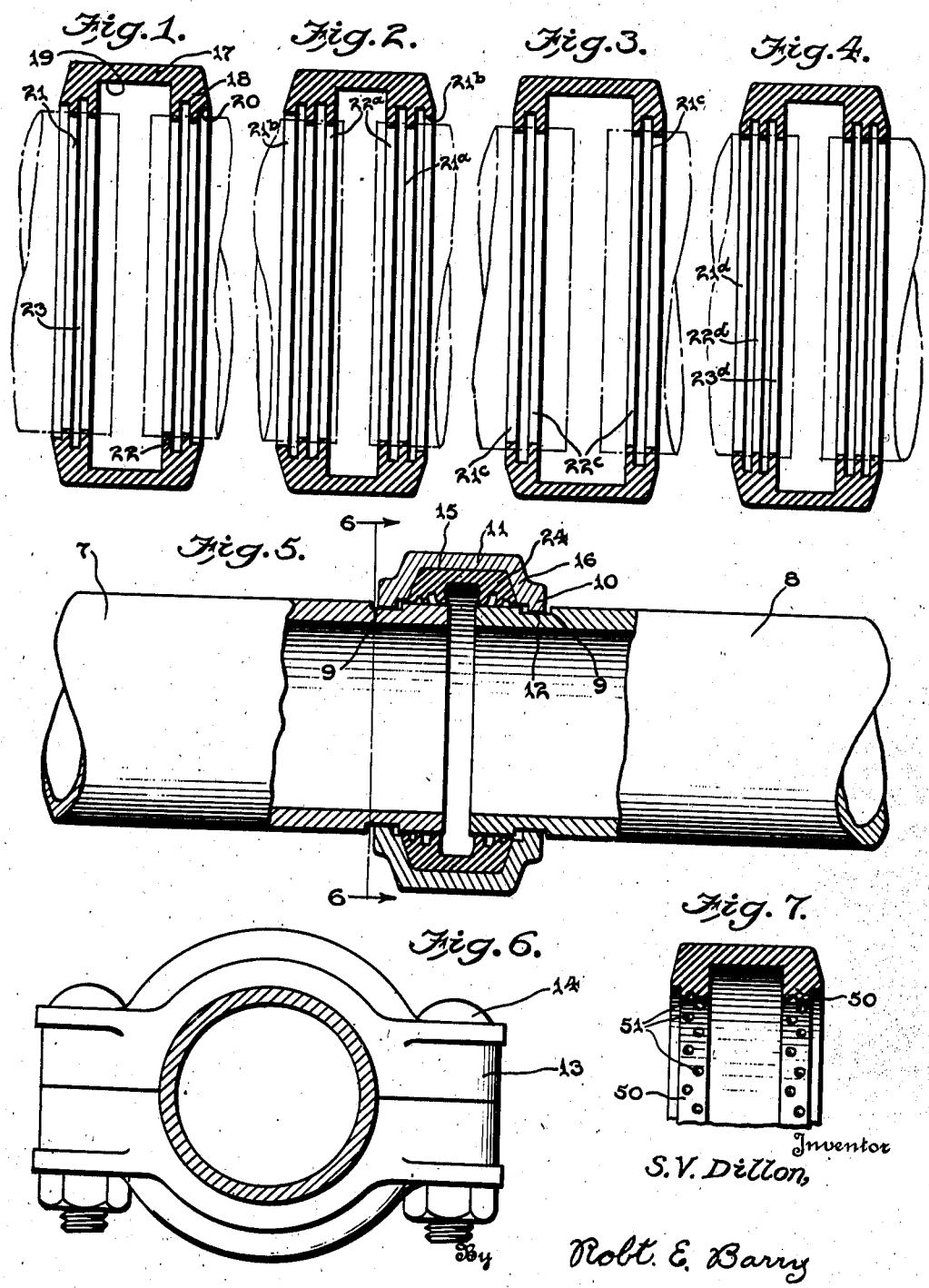

1,833,776

UNITED STATES PATENT OFFICE

STEPHEN V. DILLON, OF TULSA, OKLAHOMA

PIPE COUPLING

Application filed November 25, 1929. Serial No. 409,682.

This invention relates to improvements in pipe couplings, and more especially to improvements in couplings of the type employed with unthreaded pipe ends.

The primary object of the invention is to provide a novel packing ring for use with such couplings.

It is well known that in oil and gas pipe lines, the passing fluid frequently attacks the rubber gaskets of the couplings, and this often results in a leaky joint. It is also known that with couplings of the pressure packing type, the packing ring is liable to be torn or scored when it is placed on the ends of the pipes to be coupled, and this results in a recess or groove in the packing ring, which is a source of leakage.

Furthermore, in such joints, if there is any expansion or contraction of the pipes, or any dis-alignment of the same, this may result in leakage.

Another object of this invention is to eliminate such difficulties, and to provide a packing ring having a plurality of independent seals at each edge thereof, so that in case one seal is attacked by the gas or oil, or other fluids containing substances which attach the packing ring, another one of the seals will effectively prevent leakage, and also retain its original resiliency, because it is segregated from the attacked seal.

Another object is to furnish a packing ring so designed that if one seal is scored or mutilated, another independent seal will stop the leakage which might result from such scoring or mutilation. My ring is of such construction that this statement has been proved in actual practice.

It is a still further object of the invention to provide a packing ring having its edges turned inwardly toward the axis of the ring, and each edge terminating in inwardly extending spaced annular projections designed to grip the outer surface of a pipe along a plurality of spaced circumferential lines. Between these projections, the ring is grooved in annular form, so that a vacuum chamber will be formed between the projections and the pipe end, which will not only tend to maintain the seal and to hold the ends of the pipes together, but will allow the pipes to expand and contract, and to assume positions out of axial alignment with each other without affecting the seal. The annular web of the ring which joins the edge portions of the ring being thinner than the edge portions, functions as a hinge to allow dis-alignment of the pipes without breaking such vacuum or affecting the seal.

A further object is to furnish a pipe coupling which will withstand without leakage, shocks such as caused by internal disturbances within the earth. The present coupling will also withstand without leakage, disturbances due to wave motion, where the pipe line is under water, and can also receive without leakage, shocks caused by vehicles running over the pipe line, where such pipe line is laid along the ground surface. Furthermore, the construction is such that the coupling may be assembled and installed by unskilled labor, and will provide an effective joint when so assembled and installed. In addition a pipe line can be laid with a considerable saving of time when my couplings are interposed therein.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is a diametrical sectional view of a preferred form of my packing ring or gasket, shown in comparison with a pair of pipe ends that are illustrated in dot and dash lines.

Figs. 2, 3 and 4 are similar views of modified forms of the ring.

Fig. 5 is a diametrical sectional view, partly in elevation, of a pair of pipe ends shown connected by my improved coupling.

Fig. 6 is a transverse sectional view on the line 6—6 of Fig. 5.

Fig. 7 is a diametrical sectional view of another modification of my packing ring, in which spaced cavities or indentations are used as vacuum chambers instead of grooves.

The present coupling is especially useful with unthreaded pipe ends, and for the purpose of disclosing the invention, reference will now be made to Fig. 5. In that Figure, 7 and 8 designate rigid metal pipes having cylindrical outer surfaces which are interrupted by annular grooves 9 in the peripheries of the pipes. These grooves cooperate with inwardly extending flanges 10 that are arranged at the ends of half collars 11, and are of less thickness than the width of the grooves, to allow for expansion and contraction of the pipes. Furthermore, there is a clearance space 12 between the inner surface of each flange, and the bottom of the groove, to allow the pipes to assume positions out of axial alignment. Such dis-alignment may be caused due to uneven ground surface contour, shocks due to vehicles passing over the pipe line, earthquakes, wave motion or the like, depending on where the pipe line is located, and this feature of the invention will take care of such dis-alignment, without liability of leakage.

The half collars 11 form housing or confining ring for my packing, which will be hereinafter described, and while I have illustrated such confining ring as of one construction, I desire it to be understood that many forms of such confining means may be used without departing from the spirit of the invention. In the form illustrated, each half collar is provided with lateral ears 13 which are joined together by any suitable means, such as bolts 14. The confining ring formed by the half collars, provides an annular channel 15 which surrounds the pipe ends, and preferably has its side walls diverging toward the axis of the pipe line, as indicated at 16.

With such pipe ends and confining ring, I employ a novel packing ring or gasket of special design. As shown in Figs. 1 and 4, this ring may be made of any suitable flexible material, such as rubber, and includes an annular web 17, the edges of which extend inwardly, as shown at 18, so that an inwardly opening channel 19 is provided in the ring between the edge portions of the latter. Each edge portion is cut away as at 20, to provide an annular rabbet which will receive a pipe end and facilitate the guiding of the latter into the channel portion of the ring.

In contra-distinction to packing rings heretofore known, I provide each of the edge portions 18 of the ring with a plurality of inwardly extending annular projections 21 and 22, which operate independently of each other, and are spaced apart by an annular groove 23. At this point, it will be observed that the inner edges of the projections 21 and 22 form openings of less diameter than the external diameter of the pipes with which the packing is to be used, so that in placing a pipe end in the packing ring, the construction is such that after the pipe end has been inserted into the ring, the edges of the projections 21 and 22 will grip the pipe end along a plurality of spaced circumferential lines, and the groove 23 will cooperate with the outer surface of the pipe end to provide a vacuum chamber 24.

When such a ring is assembled in the coupling, and the coupling is installed, as shown in Fig. 1, pressure fluid travelling through the pipe line, will tend to cause the edge portions 18 of the ring to diverge, so that said edge portions, will snugly engage the surfaces 16 of the confining ring. Now, if any substance in the fluid should attack the inner projection 22, the latter will prevent the attacking substance from reaching the projection 21, so that even if the seal provided by the projection 22 should be affected, the seal provided by the projection 21 will be protected, and consequently, the ring will endure indefinitely.

Furthermore, owing to the vacuum chamber 24, the edge portion of the packing ring will always be drawn into tight engagement with the periphery of the pipe, and even though the pipe line expands and contracts, or the pipes dis-align, the seal will be maintained.

It will also be manifest that should there be a defect in the material of the packing ring, or one of the projections should be scored or torn, during installation, another one of the projections will always be present to maintain the joint and prevent leakage. Moreover, the outer surface of a pipe end is frequently rough, pitted or uneven, and by employing a plurality of seals at each edge of the packing ring, danger of leakage from this source is materially reduced, or practically eliminated.

The vacuum chambers 24 also assist the confining ring in holding the pipe ends together.

In the embodiment of the invention shown in Fig. 1, two projections 21 and 22 are provided at each edge of the ring, but of course, a greater number of such projections may be employed. For example, as shown in Fig. 2, the ring, in addition to the projections 21a and 22a, may have a third projection 21b, the opening formed by the inner edge of which is of about the same diameter as the outer surface of the pipe. It will be seen that the projection 21b does not extend in toward the axis of the ring to as great an extent as the projections 21a and 22a.

In the modification shown in Fig. 3, each edge portion of the ring is provided with the inwardly extending annular projections 21c and 22c, but the annular rabbet 20 is omitted. It has been found that when the ring is made of suitable rubber, that the annular projections 21c and 22c have sufficient resiliency to permit the ready introduction of the pipe end into the ring, even though the external diameter of the pipe is larger than the internal diameter of the edges of the projections 21c and 22c.

Instead of using two projections at each edge of the ring of the type shown in Fig. 3, I may employ a greater number of projections 21d, 22d and 23d, as shown in Fig. 4.

As shown in Fig. 7, the edge portions of the ring may be provided with single inwardly extending annular projections 50, but in order that each of these projections may provide a plurality of seals, and vacuum means, I form in the inner edge of the projection, a multiplicity of cavities or indentations 51, which are preferably in staggered relation. With a construction of this sort, the cavities 51 will take the place of the groove used for vacuum purposes, and the surface of the inner edge of the projection which is arranged about the mouths of the cavities, will provide a plurality of seals in the same manner as if a plurality of the spaced inwardly extending annular projections was employed.

In each form of the invention, the packing ring, when confined by the ring or cage 11, will withstand extremely high pressures without liability of leakage, and this is insured by employing a plurality of seals at each edge of the packing ring, and a vacuum chamber or chambers between these seals.

While I have disclosed what I now consider to be preferred embodiments of the invention in such manner that the construction, operation and advantages of the invention may be readily understood by those skilled in the art, I am aware that changes may be made in the details disclosed, without departing from the spirit of the invention, as expressed in the claims.

What I claim and desire to secure by Letters Patent is:

1. In a structure of the character described, a resilient packing ring adapted to be arranged in a housing and to extend over the adjacent extremities of a pair of pipes, said packing ring being provided with annular inwardly extending spaced projections each of said projections provided at its inner edge with a series of cup-like openings forming vacuum means adapted to grip the ends of said pipes, the ends of said ring being provided with annular rabbets forming annular edges normally of larger diameter than the inner edges of the projections which are adapted to grip the pipe ends when the rabbeted portions of the ring are held under compression by said housing.

2. In a structure of the character described, a resilient packing ring adapted to be arranged in a housing and to extend over the adjacent extremities of a pair of pipes, said packing ring being provided with annular inwardly extending spaced portions, each of said portions having an annular groove and inwardly extending annular projections at opposite sides of the groove, said projections being adapted to grip the ends of said pipes, the ends of said ring being provided with annular rabbets forming annular edges normally of larger diameter than the inner edges of the projections and adapted to grip the pipe ends, when the ring is compressed by said housing.

3. In a structure of the character described, pipes arranged end to end, a housing connected to the ends of the pipes, a resilient packing ring arranged in the housing and extending over the extremities of the pipes, said packing ring being provided with annular inwardly extending spaced portions adapted to grip the ends of the pipes, each of said portions being provided at an end of the ring with an annular rabbet, the rabbets forming annular edges at the ends of the ring which grip the pipe ends and are held under compression by the housing, the openings formed by the inner edges of said portions being of less diameter than the external diameter of the pipes when the latter are disconnected.

4. In a structure of the character described, pipes arranged end to end, a housing joining the ends of the pipes, a resilient packing ring arranged in the housing and extending over the extremities of the pipes, said packing ring being provided with inwardly extending spaced portions, each of said portions having an annular groove and inwardly extending annular projections arranged at opposite sides of the groove, said projections gripping the ends of the pipes, the ends of said ring being provided with annular rabbets forming annular edges at the ends of the ring which grip the pipe ends and are held under compression by the housing, and the openings formed by the edges of said projections being of less diameter than the external diameter of the pipes when the latter are disconnected.

STEPHEN V. DILLON.